United States Patent [19]

Zibman et al.

[11] Patent Number: 4,748,579

[45] Date of Patent: May 31, 1988

[54] METHOD AND CIRCUIT FOR PERFORMING DISCRETE TRANSFORMS

[75] Inventors: Israel B. Zibman, Newton; Nigel P. Morgan, Belmont, both of Mass.

[73] Assignee: GTE Laboratories Incorporated, Waltham, Mass.

[21] Appl. No.: 765,918

[22] Filed: Aug. 14, 1985

[51] Int. Cl.⁴ .......................................... G06F 15/332
[52] U.S. Cl. ....................................................... 364/726
[58] Field of Search .......................... 364/726, 725, 715

[56] References Cited

U.S. PATENT DOCUMENTS

| | | | |
|---|---|---|---|
| 3,581,199 | 5/1971 | Spitz | 324/77 R |
| 4,335,372 | 6/1982 | Aufderheide et al. | 340/347 DD |
| 4,393,468 | 7/1983 | New | 364/736 |
| 4,407,018 | 9/1983 | Kanomasa | 364/726 |
| 4,477,878 | 10/1984 | Cope | 364/726 |
| 4,501,149 | 2/1985 | Konno et al. | 364/726 |
| 4,539,549 | 9/1985 | Hong | 364/715 |

OTHER PUBLICATIONS

Alan V. Oppenheim et al., "Computation of the Discrete Fourier Transform", *Digital Signal Processing*, 1975, pp. 284–328.

*Primary Examiner*—David H. Malzahn
*Attorney, Agent, or Firm*—Hamilton, Brook, Smith & Reynolds

[57] ABSTRACT

A fast Fourier transform is performed under control of stretched out microcode. Sequential data inputs are multiplied by coefficients addressed by microcode in a digital multiplier. The resultant products are sequentially stored in three registers. The product stored in the second register is applied as one input to an arithmetic logic unit and the product stored in either the first or the third register is applied as the second input to the logic unit in order to compute the operation pairs (ax± by). The Fourier transform is based on Winograd Fourier transforms modified for only real inputs and to force operations into the form (ax± by). Sample points are initially scaled using the same circuit by performing an OR operation with respect to each sample point and an accumulated OR taken from the output of the ALU. The position of the most significant one bit in the final accumulated OR is indicative of the required scale factor. That scale factor is applied to the multiplier to scale each sample point.

27 Claims, 10 Drawing Sheets

$S(kn) = \sin\left(\frac{kn\pi}{32}\right)$  $C(kn) = \cos\left(\frac{kn\pi}{32}\right)$

METHOD AND CIRCUIT FOR PERFORMING DISCRETE TRANSFORMS

DESCRIPTION

BACKGROUND

The Discrete Fourier Transform (DFT) is a fundamental operation in digital signal processing and finds applications in image processing, speech processing, radar and many other fields. The DFT of a finite duration sequence of N sample points $x(n)$, $0 \leq n \leq N-1$, is defined as $$X(k) = \sum_{n=0}^{N-1} x(n) e^{-j(2\pi/N)nk}$$

$$k = 0, 1, \ldots N - 1$$

which may be conveniently written in the form $$X(k) = \sum_{n=0}^{N-1} x(n) W^{nk}$$

where $$W = e^{-j(2\pi/N)}$$

In the case where $x(n)$ is a sequence of complex numbers of the form $c+jd$, where c is the real part and d is the imaginary part, a complete direct evaluation of an N-point DFT requires $(N-1)^2$ complex multiplications and $N(N-1)$ complex additions.

The set of processes known as the fast Fourier transform (FFT) consists of a variety of techniques for reducing the time required to compute a discrete Fourier transform. Typically, an N-point DFT (where N is a power of 2) is repeatedly halved until N/2 2-point DFTs are obtained. Each 2-point DFT is then computed by the well-known 'butterfly' which performs the operation $E \pm WF$, where E and F are complex inputs and W is a complex multiplier. This approach reduces the required computation to the order of $N/2 \log_2 N$ complex multiplications and $N \log_2 N$ complex additions, a considerable saving when compared with the direct DFT.

The fast Fourier transform class of processes finds applications mostly in general-purpose transformations of large blocks of data such as where N is greater than 1000. Most FFT processors are optimized for the butterfly operation, which requires a complex multiplication and a complex addition and subtraction. This equates to four real multiplications and six real additions, subtraction being considered as the addition of a negative number. To obtain large throughput, it has often been necessary to use more than one multiplier/adder and much additional controller hardware. Some existing FFT processors also require that separate memories be used for real and imaginary data.

The Winograd fast Fourier transform reduces the number of complex operations by providing a multiplier in each butterfly operation which is a pure real or pure imaginary scalar. The processes can be further simplified where all inputs to the processor are either pure real or pure imaginary.

Small FFTs such as an 8-point FFT or a 16-point FFT can be used as building blocks in the overall transform. For example, a 192-point FFT can be based on a set of three 64-point FFTs followed by 64 3-point FFTs. Each 64-point FFT might in turn be based on two stages of FFTs, each stage including eight 8-point FFTs.

DISCLOSURE OF THE INVENTION

In accordance with principles of the present invention, an FFT process has been developed which relys principally on the operation $(ax \pm by)$ where $a,x,b$ and y are real or imaginary scalars. Under control of microcode, data inputs are processed in an electronic circuit which is optimized for performing the $(ax \pm by)$ operation. The circuit includes a multiplier which receives all data inputs, a set of registers and an arithmetic and logic unit (ALU). The registers sequentially store products from the multiplier in successive machine cycles such that each sequential pair of products is stored in the set of registers for two machine cycles. Under control of the microcode, predetermined pairs of products from the set of registers are applied to the ALU to add or subtract the products.

Specifically, a microcode instruction addresses data inputs from data memory and a multiplier coefficient from a coefficient memory, and the addressed data input and coefficient are applied to the multiplier. The microcode instruction also selects a pair of the product registers, and the products stored in those registers are applied as inputs to the ALU. The product registers may be selected through a multiplexer. The addition, subtraction or logical operation to be performed by the ALU is also selected by the microcode instruction. To simplify and increase the speed of the system, the microcode instructions are programmed as stretched-out microcode; that is, there are no logical loops or branches in the instructions. Preferably, the fast Fourier transform is based on a Winograd discrete Fourier transform simplified for only real sample points.

Preferably, a fixed point ALU is utilized and scaling of the sample points is provided by the multiplier and ALU. To that end, prior to performing the fast Fourier transform, each sample point is multiplied by a scale factor in the multiplier. The scale factor is determined by first performing a logical OR operation between each sample point and an accumulated OR ALU output. The accumulated OR output results from a preceding OR operation and is provided as a second input to the ALU through the multiplexer. After each sample point has been passed through the ALU, the accumulated OR output has a most significant one bit which is indicative of the size of the largest sample point. The scaling factor, previously stored in the coefficient memory, is addressed by an input indicative of the most significant one bit of the accumulated OR output.

Where negative values of the input data are coded as twos compliments, it is sufficient to decode the negative sample points by a ones compliment prior to the OR operation. The ones compliment and OR operation can be performed in a single machine cycle by the ALU. That ALU operation is selected through an instruction decoder in response to the microcode and a sign bit from the sample point.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
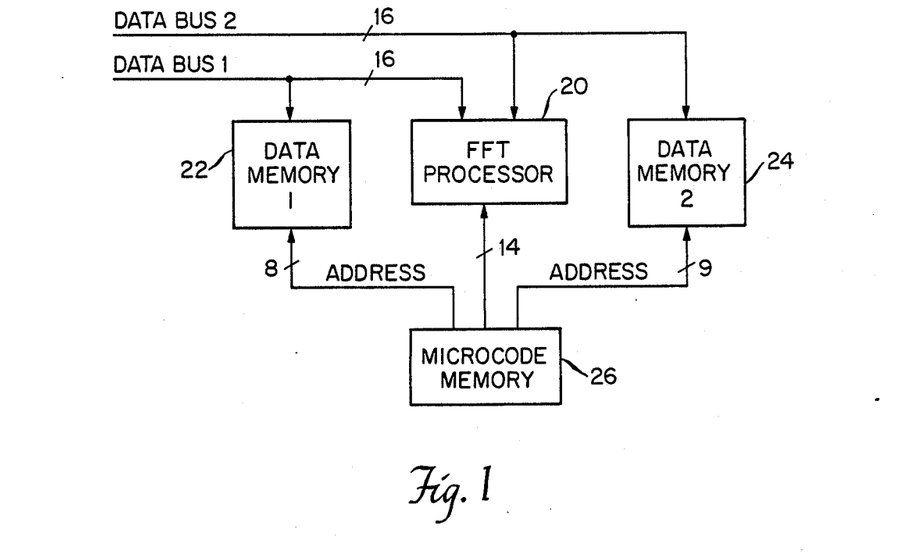
FIG. 1 is block diagram of an FFT system embodying the present invention.

A digital processing system for performing a fast Fourier transform in accordance with the present invention is illustrated in FIG. 1. It includes a special purpose FFT processor 20 which is shown in greater detail in FIG. 2. As this particular system has been developed for performing a 192-point FFT for speech processing, 192 16-bit words of sample points are addressed from either memory 22 or 24 and applied as input data to the FFT processor. The results of the first stage of processing of the 192 words of input data are returned to the other of the memories 22, 24 and subsequently addressed as input data for further processing in subsequent stages of the FFT processor. By the use of two independently addressed memory units 22 and 24, data can be read from one unit in the same machine cycle during which the result of a computation is written into the other memory. Such an approach is disclosed in our copending U.S. patent application Ser. No. 551,612, filed Nov. 14, 1983, now abandoned, and is particularly advantageous in the present system. Operation of the FFT processor and addressing of data inputs from the two data memories is controlled by microcode from a microcode memory 26.

As will be discussed in detail below, the FFT process controlled by the microcode is based on a minimal number of operations which the FFT processor 20 has been designed to handle most efficiently. By far the most prevalent operation in the process is that of $ax \pm by$ where x and y are pure real or pure imaginary data inputs and a and b are scalar multiplier coefficients. A disadvantage of such optimization is the irregularity of the sequence of operations. It would be difficult to write code for the process as a small set of frequently repeated loops. However, this optimization brings the total number of operations down to about 2,000. Thus, it is feasible to use stretched-out microcode, code that contains no loops or branches. Stretched-out microcode allows for faster operation of the system; operations can be optimized because there are no general purpose loops and there are no time consuming jump and branch instructions in the FFT execution. Further, the stretched-out microcode obviates complicated hardware sequencers and multiple instruction formats.

A 32-bit-wide microinstruction having the following format is used:

Bus 1 Address / Bus 2 Address / PROM Address OP-Code /S /REG /MULT

Figure 2:
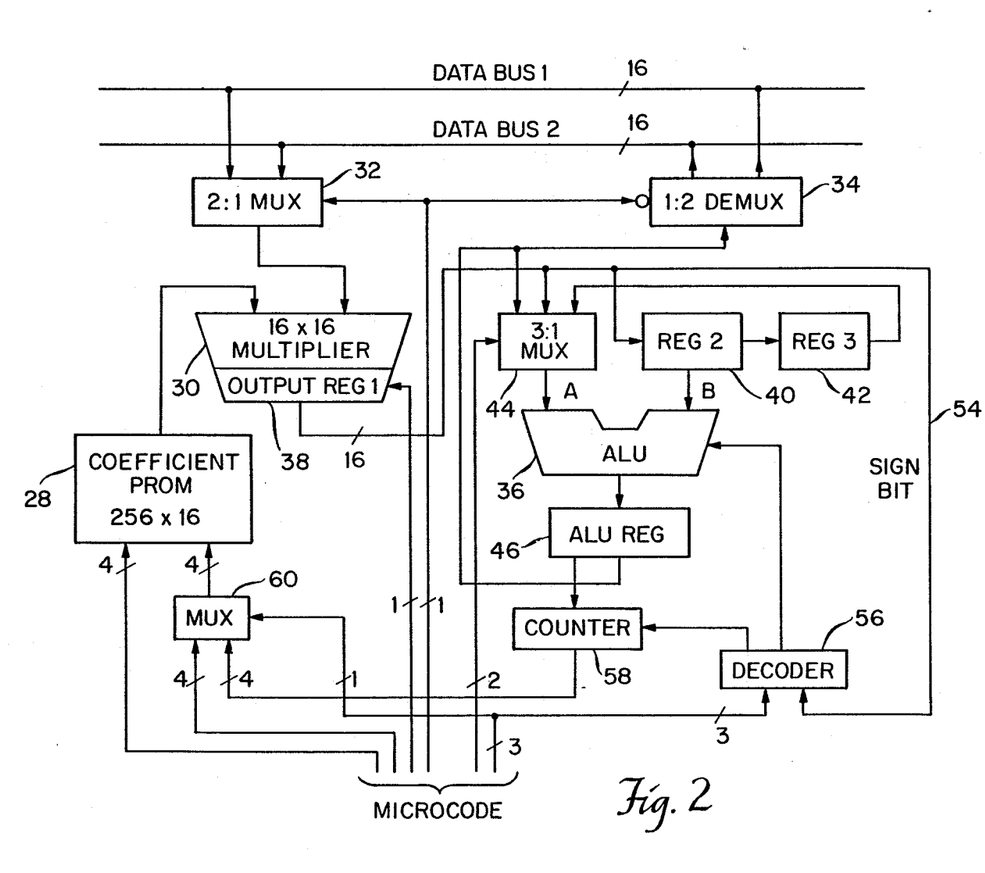
FIG. 2 is an electrical block diagram of the FFT processor of FIG. 1.

The first 17 bits address the data memories 22 and 24. Inputs to the FFT processor are taken from one of the memories 22, 24, and arithmetic results from the processor are returned to the other memory. The next byte addresses a coefficient PROM 28 in the FFT processor. The coefficient PROM provides multiplier coefficients to one input of a multiplier 30 as data addressed from either of the memories 22, 24 is applied to the other input. Bit 28 of the microcode, the S bit, indicates which memory is the source and which is to receive the results and controls input and output multiplexers 32 and 34. Bits 25, 26 and 27, the OP-Code bits, determine the operation to be performed by an arithmetic and logic unit, ALU 36, in the processor. The specific ALU used in this system is a cascade of four 4-bit ALU devices, type 74LS381. Products obtained in the multiplier 30 are sequenced through three registers 38, 40 and 42 and pairs of the products held in those registers are selected as inputs to the ALU by REG bits 29 and 30 applied to a multiplexer 44. The final bit indicates whether the least significant or most significant bits generated by a multiplication are output through the multiplier register 38.

Operation of the processor of FIG. 2 to perform the fundamental operation set of $(ax+by)$ and $(ax-by)$ will now be described with respect to the following Table 1.

TABLE 1

To compute $a_1x_1 + b_1y_1, a_1x_1 - b_1y_1, a_2x_2 + b_2y_2, a_2x_2 - b_2y_2, \ldots$

| Cycle | From Bus 1 | From PROM | Reg 1 | Reg 2 | Reg 3 | To Bus 2 |
|---|---|---|---|---|---|---|
|  | $x_1$ | $a_1$ |  |  |  |  |
| 1 | $y_1$ | $b_1$ | $a_1x_1$ |  |  |  |
| 2 | $x_2$ | $a_2$ | $b_1y_1$ | $a_1x_1$ |  |  |
| 3 | $y_2$ | $b_2$ | $a_2x_2$ | $b_1y_1$ | $a_1x_1$ | $a_1x_1 + b_1y_1$ |
| 4 | $x_3$ | $a_3$ | $b_2y_2$ | $a_2x_2$ | $b_1y_1$ | $a_1x_1 - b_1y_1$ |
| 5 | $y_3$ | $b_3$ | $a_3x_3$ | $b_2y_2$ | $a_2x_2$ | $a_2x_2 + b_2y_2$ |
| 6 | $x_4$ | $a_4$ | $b_3y_3$ | $a_3x_3$ | $a_3x_3$ | $a_2x_2 - b_2y_2$ |

Assuming that each data input is taken from data memory 22 along data bus one, each input $x_1, y_1, x_2, y_2, \ldots$ is applied through the multiplexer 32 to one input of the multiplier 30. As each data input is applied to the multiplier, a predetermined multiplier coefficient is selected from the PROM 28 and applied as the second input to the multiplier. The product of the two inputs, for example, $a_1 x_1$ or $b_1 y_1$, is retained for one machine cycle of the ALU 36 in the output register 38, register 1. During the next two machine cycles the product is sequentially held in registers 40 and 42, registers 2 and 3, as new products are generated.

Much of the power of the processor is derived from the arrangement of the three pipeline registers 38, 40 and 42 which ensure that each product is available as an input to the ALU for three consecutive machine cycles. Initially, it takes four cycles for the pipeline to become full. Once full, a new operation (ax±by) is computed every two cycles. Since each operation requires two multiplications and two additions, this is the fastest speed obtainable with a single multiplier and a single adder.

As can be seen from the above table, after the first machine cycle the product $a_1 x_1$ is available in register 1. After the second machine cycle, products $a_1 x_1$ and $b_1 y_1$ are available in registers 2 and 1 respectively and can be applied to the ALU to obtain the addition $a_1 x_1 + b_1 y_1$ in the third machine cycle. The products are then shifted to registers 2 and 3 and are available in the next machine cycle as the inputs for the subtraction $a_1 x_1 - b_1 y_1$. As the addition is performed by the ALU, the first of the next pair of products $a_2 x_2$ is made available by the multiplier in register 1. During the subtraction of the first pair of products by the ALU, the second product $b_2 y_2$ of the second pair of products is made available in register 1 and the first product of that pair is shifted to register 2. In the next two machine cycles the addition and subtraction of those products is obtained. It can be seen that so long as the FFT process calls for successive operations (ax±by) the FFT processor performs as efficiently as possible using a single multiplier and a single ALU.

It can be noted that the ALU output is retained in an ALU register for one cycle and then directed through the demultiplexer 34 to the receiving data bus 1 or 2. The ALU output may also be returned through the multiplexer 44 as one input to the ALU. That data path facilitates implementation of scaling of the sample points as will be described below. It is also useful in computing a series of additions as required in some transforms.

The specific system disclosed provides a 192-point FFT. Its logical configuration includes three sets of 64-point FFTs followed by 64 3-point FFTs. However, because the processor has been designed for use with only real inputs such as those found in speech encoding, computations using the imaginary inputs to a typical 192-point FFT are eliminated. Further, computations which would produce complex conjugates of already computed outputs are also eliminated. In this regard, when the input sequence is real, the outputs include conjugate pairs $c+jd$ and $c-jd$. The processor utilizes real arithmetic and real storage and simply stores real and imaginary parts separately in storage. Hence, knowing the real and imaginary parts c and d is equivalent to knowing each of the complex conjugate pairs and only one need be computed. As a result of the design for only real inputs, each of the 64-point FFTs is substantially simplified and the 3-point FFTs have been reduced to 33 in number as shown in FIG. 3.

Figure 3:
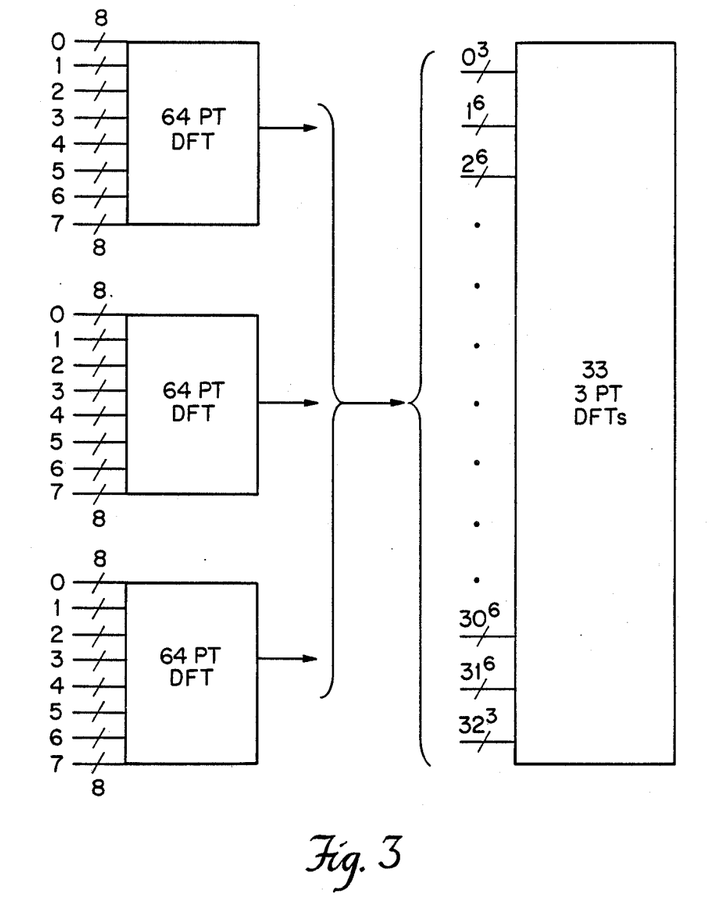
FIG. 3 is a logic block diagram of an FFT carried out in the system of FIGS. 1 and 2.

Each of the 64-point FFTs of FIG. 3 is based on two stages of eight 8-point FFTs. As will be shown by the more detailed description of those 8-point FFTs, merely eliminating the computations based on imaginary inputs results in a significant number of the computations being of the form (ax±by). The computations of several complex multiplications can also be forced into the operation (ax±by). For example, the complex multiplier $e^{j\pi/4}$ is equal to the complex number $\sqrt{2}/2 + j\sqrt{2}/2$. Multiplying a complex input $(x+jy)$ by that complex multiplier provides the product $(\sqrt{2}/2)x - (\sqrt{2}/2)y + j((\sqrt{2}/2)x + (\sqrt{2}/2)y)$ which is in the form (ax+by) to provide the imaginary term and (ax−by) to provide the real term. As a final result, an FFT can be provided in which over 75% of the ALU operations are devoted to the operation pair (ax±by) performed in successive machine cycles, where a and b are multiplier coefficients and x and y are successive data inputs.

Figure 5:
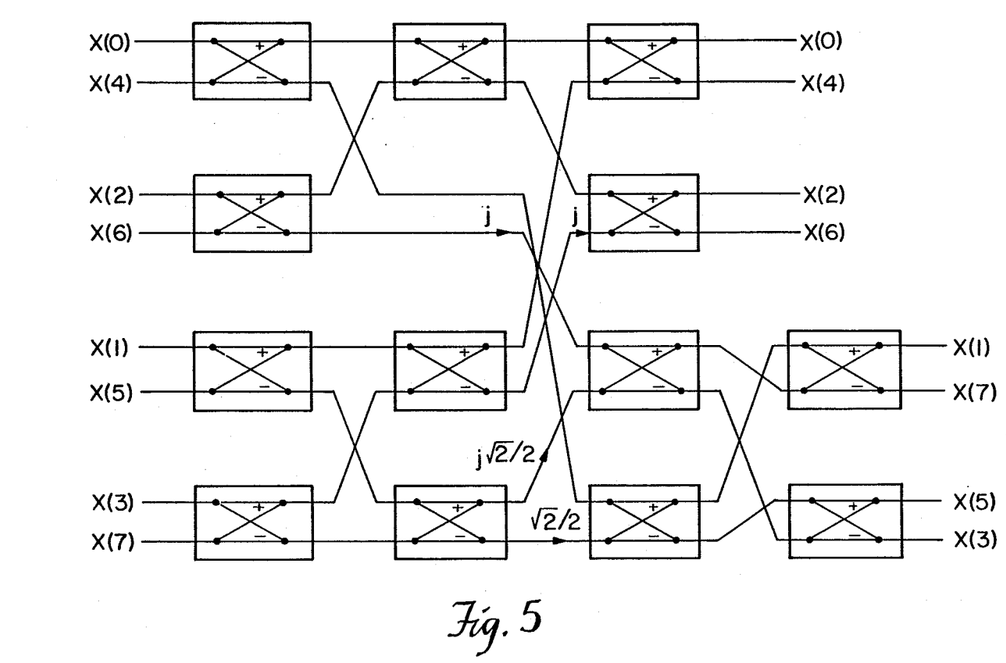
FIG. 5 is a logic block diagram of a Winograd 8-point DFT having complex inputs.

In the present system, the Winograd 8-point FFT, shown in FIG. 5, is used as the building block for the 64-point FFTs. The 8-point FFT of FIG. 5 includes eight complex inputs, each of the form $c+jd$, and eight complex outputs. Each of the blocks of FIG. 5 represents a complex butterfly which performs the operation $E \pm F$ where E and F are complex inputs, each of the form $c+jd$. The terms indicated at the arrows leading into the butterflys are multiplier coefficients which, in a Winograd FFT, are pure real or pure imaginary scalars.

Figure 4:
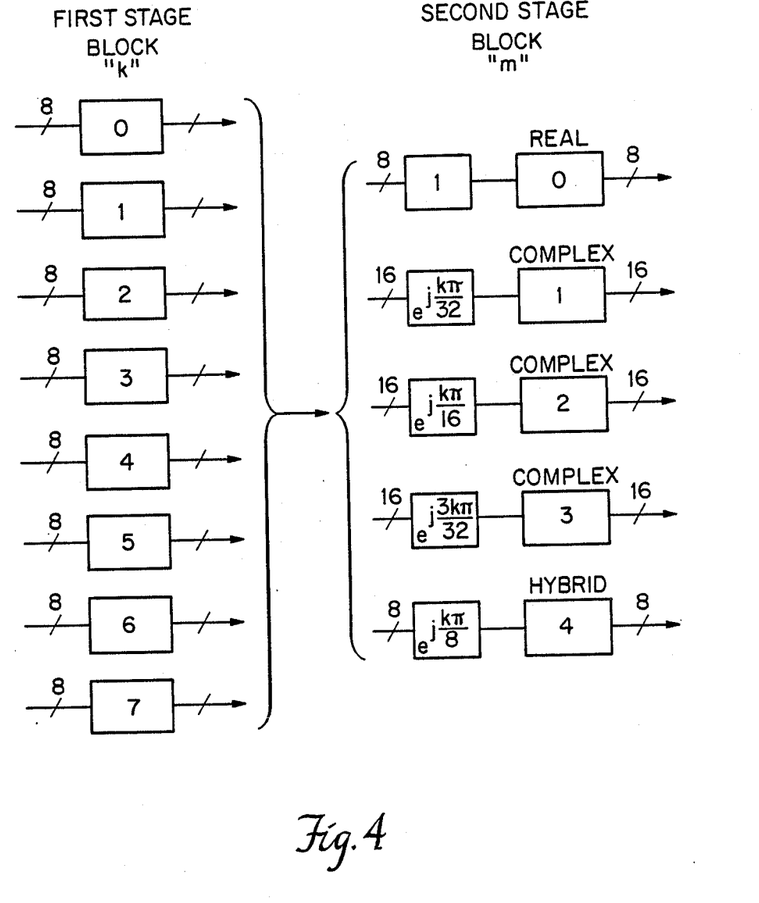
FIG. 4 is a logic block diagram of each of the 64-point FFTs of FIG. 3.
Figure 6:
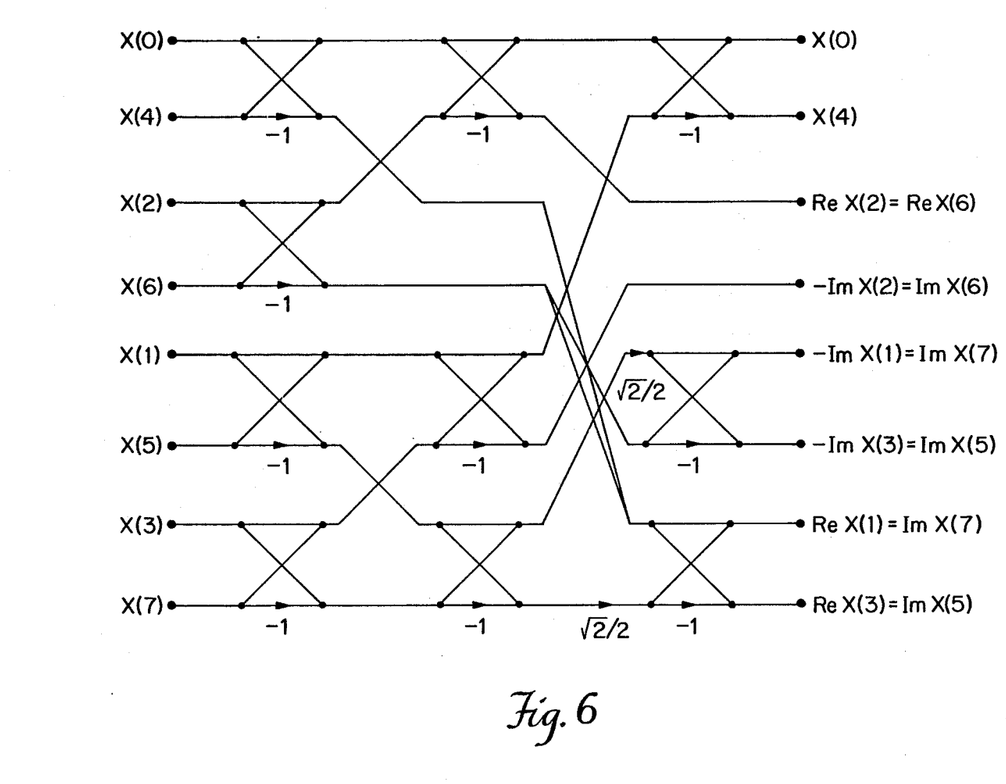
FIG. 6 is a logic block diagram of a Winograd 8-point DFT simplified for all real inputs and used where applicable in the 64-point FFTs of FIG. 4.

As noted above, each input to the system is real so each of the Winograd 8-point DFTs of the first stage of FIG. 4 can be simplified as shown in FIG. 6. Each of the butterflys in FIG. 6 represents the operation (ax±by). The operations performed in this FFT are set forth in Table 2. It can be seen that the computations can be set in pairs defining the operation (ax±by) where a and b are most often unity.

TBLE 2

| 8-Point Winograd DFT (Real-Inputs) | | |
|---|---|---|
| A = $X_0 + X_4$ | A' = A + C | X(0) = A' + B' |
| E = $X_0 - X_4$ | C' = A − C | X(4) = A' − B' |
| C = $X_2 + X_6$ | | Re X(2) = C |
| G = $X_2 - X_6$ | | Im X(2) = D |
| B = $X_1 + X_5$ | B' = B + D | Im X(1) = 0.707 F' + G |
| F = $X_1 - X_5$ | D' = B − D | Im X(3) = 0.707 F' − G |
| D = $X_3 + X_7$ | F' = F + H | Re X(1) = C + 0.707 H' |
| H = $X_3 - X_7$ | H' = F − H | Re X(3) = E − 0.707 H' |

It can be seen from FIG. 6 that the output of the real FFTs of the first stage includes two real scalars and three conjugate pairs. As noted above, only one complex number of each conjugate pair need be calculated and stored. The resultant three complex numbers are stored as the six scalars indicated.

As a result of the complex outputs from the first stage, the second stage 8-point FFT inputs are not totally real. Rather, as shown in FIG. 4, one of the FFTs of the second stage receives only real inputs, one FFT receives both real and complex inputs and the three remaining FFTs receives complex inputs.

Figure 7:
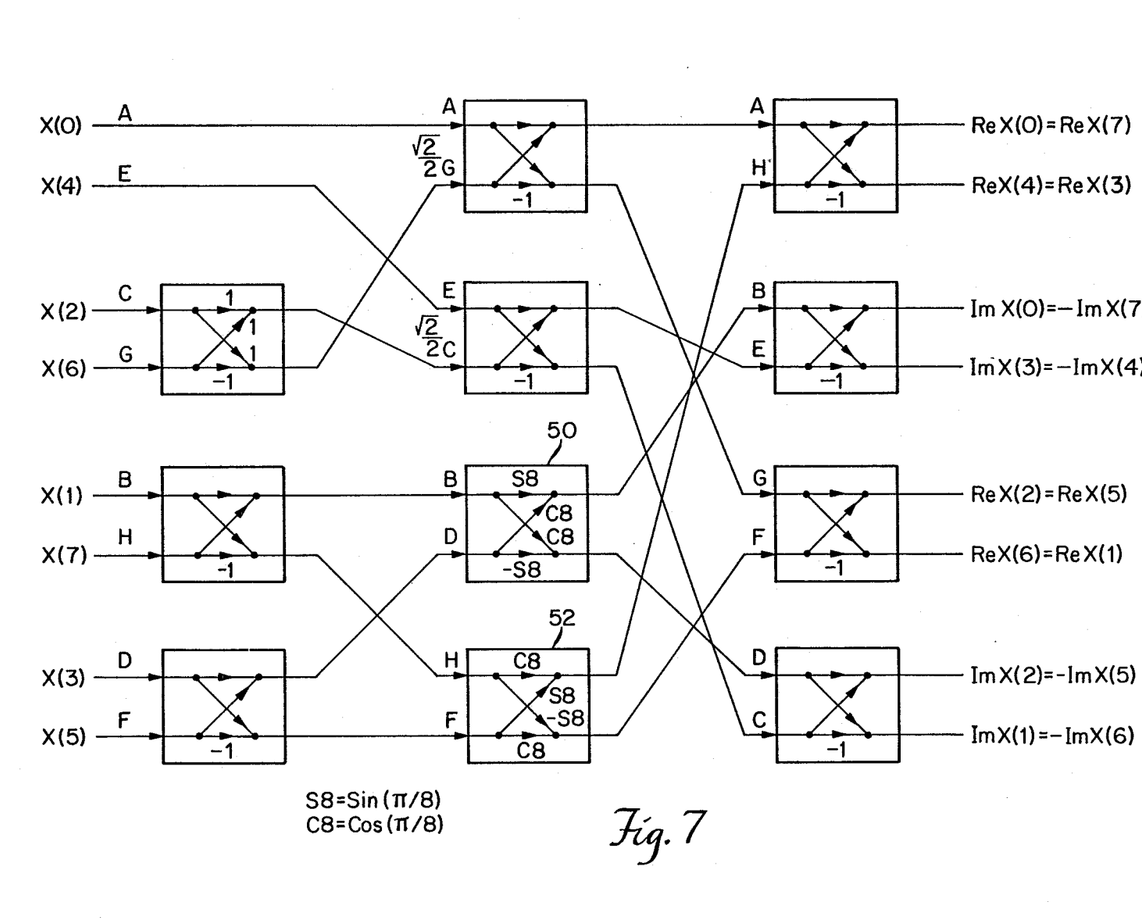
FIG. 7 is a logic block diagram of a hybrid FFT having both real and complex inputs and used in the second stage of the 64-point FFT of FIG. 4.

The hybrid FFT is shown in FIG. 7. It can be noted that two of the computational blocks 50 and 52 do not set forth the operation (ax±by). Rather, these block perform the complex multiplication $(a+jb)(x+jy)$ which is equivalent to $(ax-by)+j(bx+ay)$. This operation can be performed by the processor of FIG. 2 but requires four machine cycles as illustrated in Table 3.

TABLE 3

| Reg 1 | reg 2 | Reg 3 | To Bus 2 |
|---|---|---|---|
| by | ax | | |
| bx | by | ax | ax − by |
| ay | bx | by | No operation |
| — | ay | by | bx + ay |
| — | — | ay | No operation |

Figure 8:
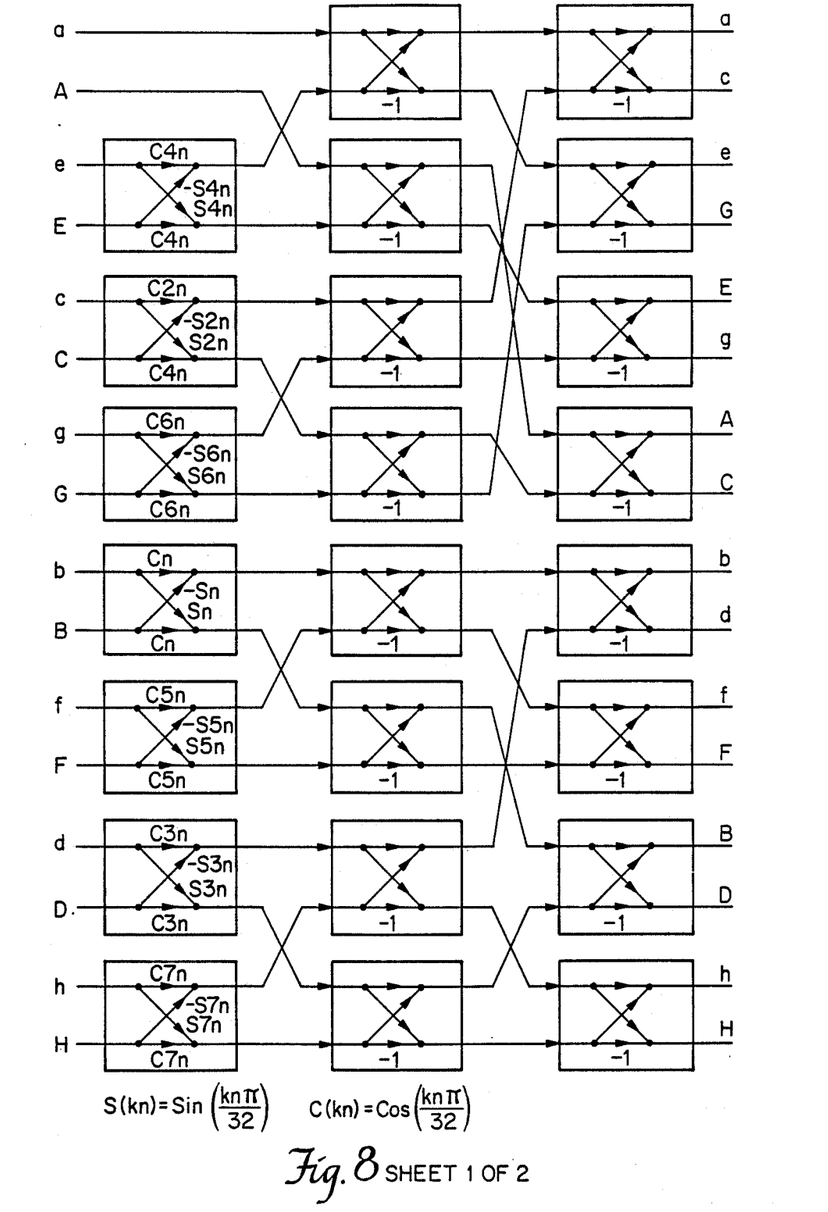
FIG. 8 consists of two sheets and is a logic block diagram of an 8-point FFT having complex inputs and used in the second stage of the 64-point FFT of FIG. 4.

A complex 8-point FFT which forms three of the FFTs of the second stage of FIG. 4 is illustrated in FIG.

8. The large number of operations (ax±by) and the several complex multiplications are evident.

Figure 9:
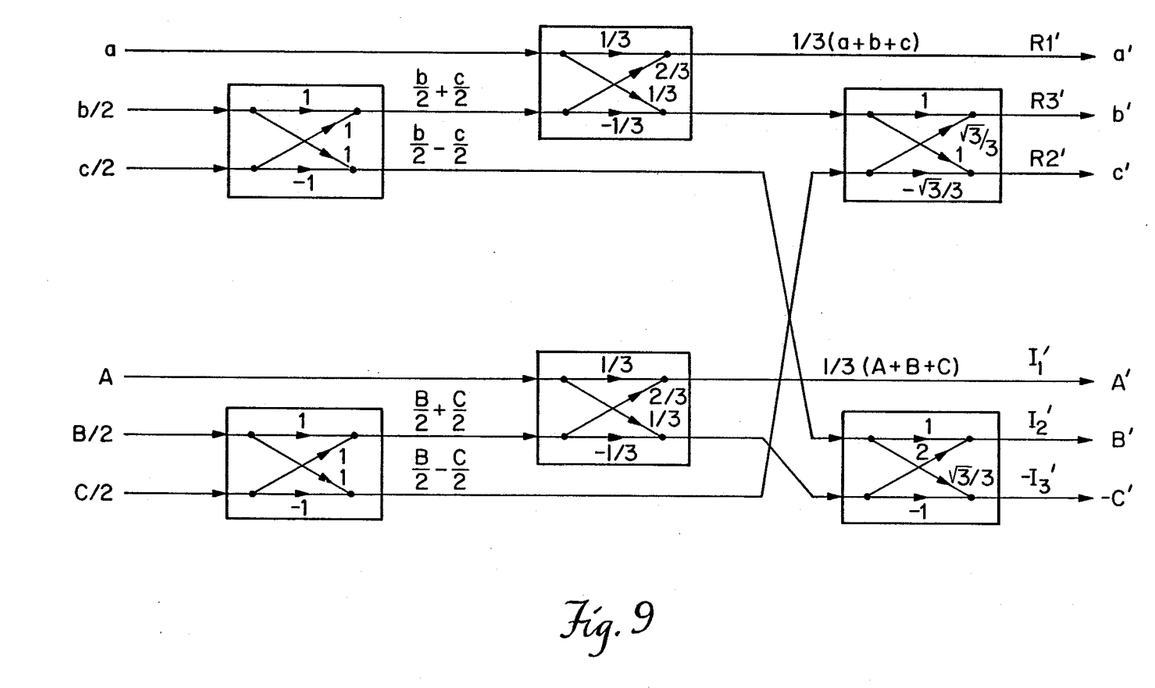
FIG. 9 is a logic block diagram of a 3-point FFT utilized in the system of FIG. 3.

FIG. 9 illustrates one of the 33 3-point FFTs indicated in FIG. 3. Computation of the 3-point FFT is facilitated by the availability of the ALU output as an input to the ALU through the multiplexer 44. For example, the output A' can be seen as being of the form ax+by+cz. The sum ax+by can be calculated and that sum can then be added to cz in the next machine cycle with the ALU register 46 providing one input to the ALU..

The hardware cost of the FFT processor of FIG. 2 is held down by the use of fixed point multiplier and ALU devices. Since 16-bit, fixed-point arithmetic is employed in the FFT processor, some numerical accuracy will be lost due to truncation and rounding in the ALU. To minimize these effects, each frame of data is, prior to calculation of the FFT, scaled up to ensure that the data point that has the maximum magnitude has a binary 1 (or binary 0 for negative numbers) in the most significant bit position, excluding the sign bit. Every sample point in the frame is scaled up by the same factor, and this factor is transmitted along with the transform data to the inverse FFT processor so that the data may be scaled down to its original level when it is returned to the time domain.

The scaling process comprises three operations: finding the order of magnitude of the largest sample point in the frame, computing the scale factor, and multiplying each sample point in the frame by the scale factor. Negative numbers are encoded as twos complements. The twos complement negative of a binary number is formed by complementing each bit in the number and adding one to the result. If negative numbers are complemented first, the problem of finding the order of magnitude of the largest sample point reduces to detecting the position of the most significant binary 1 over all sample points. This may be done by performing a logical OR of all input data points. For example, consider:

A=0000 0011 0101 0000

B=0000 0001 1100 1111

C=1111 0100 1001 0101

First perform A or B to give (AVB)=0000 0011 1101 1111

This result is then ORed with C, which must first be complemented since it is a negative number:

(AVB) V $\overline{C}$=0000 1011 1111 1111

This number is meaningless except for the position of the most significant binary 1. It is always in the same position as the most significant binary 1 of the largest operand (in this case, $\overline{C}$).

Having obtained the "accumulated OR" of all input data, the scale factor can be computed by shifting this number up repeatedly and counting the number of shifts, n, required to produce a binary 1 in the fifteenth bit position. The scale factor is then given by $2^n$. For the example shown above, n is 3, and the scale factor is 8.

The processor 20 of FIG. 2 has been designed to provide efficient scaling of the initial data points using the approach described above. To that end, each data point is passed through the ALU from register 2. The point held in register 2 is ORed in the ALU with an accumulated OR output from the ALU register 46 through the multiplexer 44. Once each data point has been involved in an OR operation, the position of the most significant one bit in the accumulated OR in register 46 is indicative of the scale factor required.

It has been noted that the present system utilizes twos complement negative encoding. In addition, each data word includes a sign bit. Because the selected ALU does not itself perform a twos complement operation, to twos complement the negative numbers in this approach would require additional machine cycles. However, one operation of the ALU is an OR operation in which one of the inputs is first ones complemented. A ones complement of a word is simply the word formed by complementing each bit. It has been determined that ORing of ones complements of the negative sample points accurately provides the scaling factor for twos complemented negative numbers. To provide for the OR operation A V B when the sample point is a positive number and the operation A V $\overline{B}$ when the sample point is a negative number, the sign bit of each sample point is applied along line 54 to a decoder 56 along with a microcode input. The decoder applies control bits to the ALU to control the operation of the ALU. During the scaling operation in which the accumulated OR is being generated, the operation of the ALU is determined by both the microcode input and the sign bit input to the decoder 56.

Once all sample points have been passed through the ALU to generate the accumulated OR, the position of the most significant binary one bit is determined by shifting the bits in the ALU register and simultaneously counting those shifts in a counter 58. The counter 58 is disabled when a one bit is detected in the fifteenth bit position in the register, that is in the bit position adjacent to the sign bit.

The scale factor by which each sample point must then be multiplied to scale the data is of the form $2^n$ where n is a value from 0 through 14 determined by the position of the most significant bit in the accumulated OR. That bit position held by counter 58 and defined by 4 bits is then used to address the PROM 28 through a mutliplexer 60. Fifteen locations of the coefficient PROM 28 are reserved for fifteen possible values of $2^n$. Location. n of coefficient PROM 28 contains the value $2^n$. To then scale each of the sample points, each point is passed through the multiplier 30 as a scaling muliplier coefficient $2^n$ is applied from the coefficient PROM to the second input of the multiplier.

Because products from the multiplier 30 are added in the ALU during computation of the fast Fourier transform, and each of the data inputs may be of full scale and multiplied by a coefficient as large as unity, it is possible for the result of an operation (ax+by) to be double the previous full scale value. To avoid such a result, each input to the processor during computation of the FFT is scaled down by one-half in each stage of the FFT. Scaling down by one-half can be recognized as a shift of the most significant bit by one bit position and the thus computed FFT can be readily scaled back up during the inverse Fourier transform.

This scaling of each input data value applied to the processor is obtained without any additional operations because each data point is already applied through the multiplier. Therefore, this reduction in scale is obtained by merely storing appropriate multiplier coefficients in the PROM 28.

The system described provides a very efficient 192-point or other small sample size Fourier transform in approximately one-fifth of the time taken by conventional FFT processors utilizing a single multiplier/adder. For a 192-point transform, the system obtains a scale factor in 192 machine cycles, scales the sample points in 192 cycles and computes the Fourier transform in 2200 cycles.

While the invention has been particularly shown and described with reference to a preferred embodiment thereof, it will be understood by those skilled in the art that various changes in form and details may be made therein without departing from the spirit and scope of the invention as defined by the appended claims. For example, the hardware and the transform approach can be utilized for other transforms such as the discrete cosine transform.

We claim:

1. A method of performing a discrete transform of sample points in a digital electronic circuit including an arithmetic logic unit (ALU) which performs an operation in each of successive machine cycles, the method comprising applying a series of data inputs, including the sample points, to a digital multiplier and multiplying each data input with a predetermined multiplier coefficient to obtain a product, storing sequential products in a set of registers such that each sequential pair of products is stored in the set of registers for two machine cycles, and applying predetermined pairs of products from the set of registers to the ALU to perform an operation of addition on each pair of products.

2. A method as claimed in claim 1 wherein the data inputs, multiplier coefficients, registers and ALU operations are selected by a sequence of stretched-out microcode instructions.

3. A method as claimed in claim 2 wherein at least about 75% of the ALU operations are devoted to the operation pair (ax±by) performed in successive machine cycles, where a and b are multiplier coefficients and x and y are successive data inputs.

4. A method as claimed in claim 3 wherein the transform is a fast Fourier transform based on Winograd discrete Fourier transforms simplified for only real inputs.

5. A method as claimed in claim 1 wherein at least about 75% of the ALU operations are devoted to the operation pair (ax±by) performed in successive machine cyles, where a and b are multiplier coefficients and x and y are successive data inputs.

6. A method as claimed in claim 1 further comprising the step of scaling a plurality of sample points by sequentially applying the sample points to the ALU and performing a logical OR operation between each sample point and an accumulated OR ALU output resulting from a preceding logical OR operation, selecting a scale factor based on the position of the most significant bit of the accumulated OR output after performing the logical OR operation with respect to each of the plurality of sample points, and multiplying each sample point by the scale factor.

7. A method as claimed in claim 6 wherein negative sample points are encoded as twos complements and the logical OR operation of the arithmetic logic unit selected when a negative sample point is applied to the ALU is the logical OR of the accumulated output and the ones complement of the sample point.

8. A method as claimed in claim 7 wherein the multiplier coefficients and scale factors are stored in a coefficient memory, the coefficient memory being addressed by microcode to select the multiplier coefficients, and the coefficient memory being addressed in the step of scaling by an input indicative of the most significant bit of the accumulated OR output to select the scale factor by which each sample point is multiplied.

9. A method as claimed in claim 6 wherein the transform comprises successive stages of operations in which data inputs to successive stages are the outputs of prior stages, and all multiplier coefficients are such that each data input is scaled down to less than half of full scale.

10. A method as claimed in claim 1 further comprising applying each of a sequence of sample points to the ALU to determine a scale factor indicative of the size of the largest sample point, thereafter applying each sample point through the multiplier to multiply the sample point by a scaling factor to scale the sample point, and completing the transform based on the scaled sample points by applying each of sequential data inputs, including the scaled sample points, through the multiplier, to multiply the data input with a transform coefficient, and to the ALU to generate further data inputs and transform outputs.

11. The method as claimed in claim 1 further comprising addressing memory with microcode instructions to obtain the data inputs and multiplier coefficients applied to the digital multiplier, storing the sequential products in first, second and third registers and, in each cycle of the ALU, applying the product stored in the second register as one input to the ALU and the product stored in either the first or the third register as the second input to the ALU.

12. A method as claimed in claim 11 further comprising applying each of a sequence of transform sample points to the ALU to determine a scale factor by performing a logical OR operation between each sample point and an accumulated OR ALU output applied to the input of the ALU.

13. A method as claimed in claim 12 further comprising detecting the most significant bit of the accumulated OR ALU output and addressing memory based on a detected most significant bit to provide a scale factor as one input to the multiplier.

14. A method as claimed in claim 13 further comprising decoding instructions to the ALU in response to microcode and to a sign bit of the sample point such that an OR instruction or a ones complement OR instruction is generated with a particular microcode dependent on the sign bit.

15. A method of performing a discrete transform of sample points comprising providing a transform circuit including a digital multiplier at the input thereof and an arithmetic logic unit (ALU), applying each of a sequence of transform sample points to the ALU in an operation which determines a scale factor indicative of the size of the largest sample point, thereafter applying each sample point through the multiplier to multiply the sample point by a scaling factor to scale the sample point, and completing the transform based on the scaled sample points by applying each of successive data inputs, including scaled sample points, to multiply the data input with a transform coefficient, and to the ALU to generate further data inputs and transform outputs.

16. A method as claimed in claim 15 further comprising performing a logical OR operation in the ALU between each sample point and an accumulated OR ALU output resulting from a preceding logical OR operation and selecting a scale factor based on the position of the most significant bit of the accumulated OR output after performing the logical OR operation with respect to each of the plurality of sample points.

17. A method as claimed in claim 16 wherein negative sample points are encoded as twos complements and the logical OR operation of the arithmetic logic unit selected when a negative sample point is indicated is the logical OR of the accumulated output and ones complement of the sample point.

18. A method as claimed in claim 17 wherein the multipliers are stored in a coefficient memory addressed by microcode, the coefficient memory being addressed alternatively by an input indicative of the most significant bit of the accumulated OR output to select the scale factor by which each sample point is multiplied.

19. A method of performing a discrete transform comprising the steps of scaling a plurality of sample points by sequentially applying the sample points to an ALU and performing a logical OR operation between each sample point and an accumulated OR ALU output resulting from a preceding logical OR operation, selecting a scale factor based on the position of the most significant bit of the accumulated OR output after performing the logical OR operation with respect to each of the plurality of sample points, and multiplying each sample point by the scale factor.

20. A method as claimed in claim 19 wherein negative sample points are encoded as twos complements and the logical OR operation of the arithmetic logic unit selected when a negative sample point is indicated is the logical OR of the accumulated output and ones complement of the sample point.

21. A method as claimed in claim 20 wherein the multiplier coefficients and scale factors are stored in a coefficient memory, the coefficient memory being addressed by microcode to select the multiplier coefficients, and the coefficient memory being addressed in the step of scaling by an input indicative of the most significant bit of the accumulated OR output to select the scale factor by which sample point is multiplied.

22. A method as claimed in claim 19 wherein the transform comprises successive stages of operations in which data inputs to successive stages are the outputs of prior stages, and all multiplier coefficients are such that each data input is scaled down to less than half of full scale.

23. A digital circuit for performing a discrete transform comprising:
    microcode memory having microcode instructions stored therein;
    data memory addressed under control of microcode instructions from the microcode memory to provide sucessive data inputs;
    a multiplier for receiving every data input addressed under control of microcode instructions;
    coefficient memory addressed under control of microcode instructions from the microcode memory for providing a multiplier coefficient to the multiplier with each data input;
    first, second, and third registers for sequentially storing products from the multiplier in successive machine cycles;
    an arithmetic logic unit (ALU) connected to received as one input the product stored in the second register; and
    a selector controlled by microcode instructions for applying as a second input to the ALU the product stored in either the first register or the third register.

24. A digital circuit as claimed in claim 23 further comprising an ALU output register for receiving the output from the ALU, wherein the selector is further connected to apply as the second input to the ALU the output stored in the output register.

25. A digital circuit as claimed in claim 24 further comprising means for detecting the most significant bit of an output stored in the output register and means for addressing the coefficient memory based on the detected most significant bit.

26. A digital circuit as claimed in claim 25 further comprising an instruction decoder responsive to microcode instructions and to a sign bit of input data to generate an ALU instruction such that an OR instruction or a ones complement OR instruction is generated with a particular microcode dependent on the sign bit.

27. A digital circuit as claimed in claim 23 wherein the data memory comprises a pair of independently addressed memory units.

* * * * *